March 19, 1935.  H. E. MORTON  1,995,104
RECIPROCABLE RAM FLASH REMOVING MACHINE
Filed Aug. 16, 1933  2 Sheets-Sheet 1

INVENTOR
Henry E. Morton,
BY
ATTORNEYS

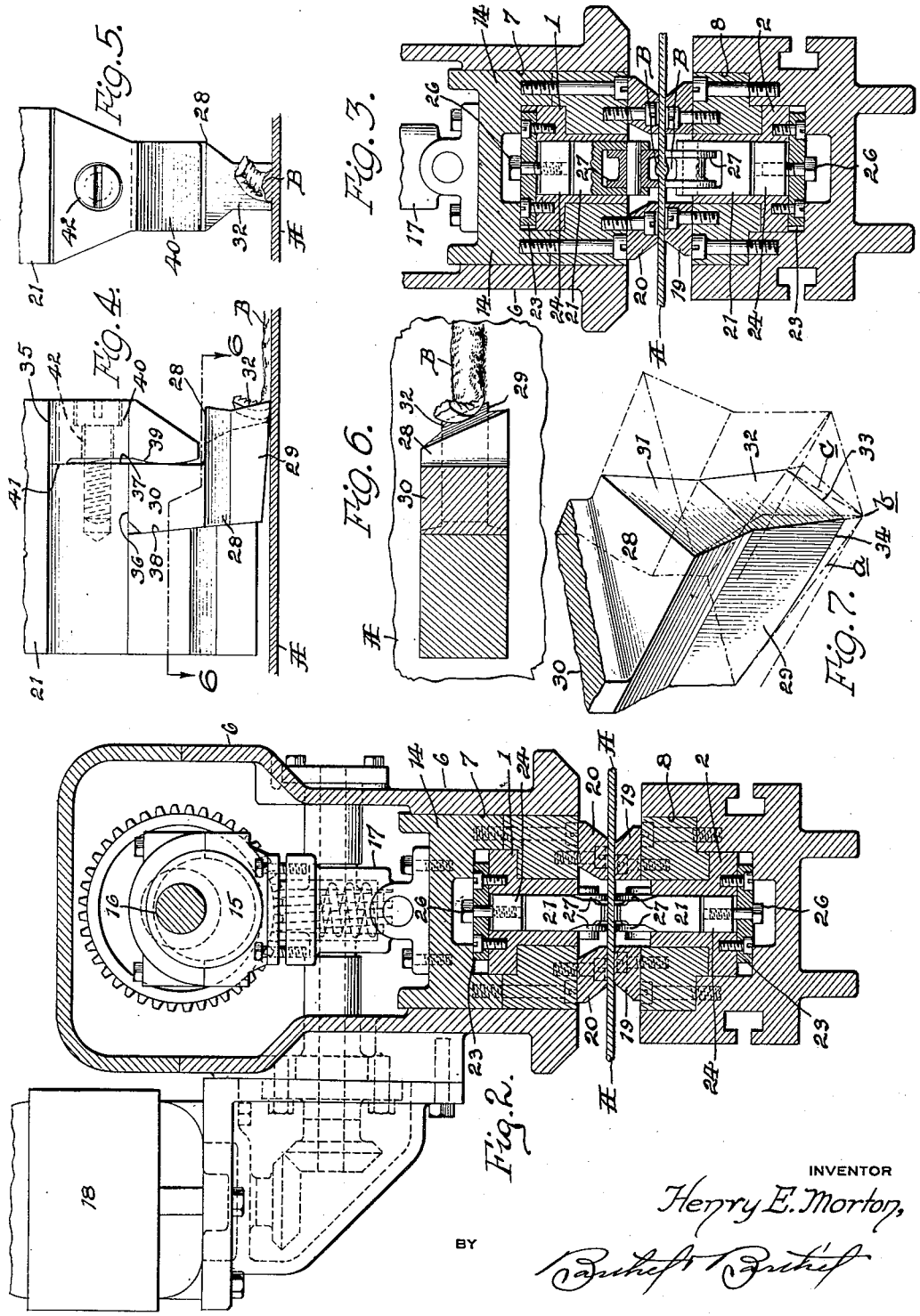

Patented Mar. 19, 1935

1,995,104

UNITED STATES PATENT OFFICE 1,995,104

RECIPROCABLE RAM FLASH REMOVING MACHINE

Henry E. Morton, Muskegon Heights, Mich.

Application August 16, 1933, Serial No. 685,426

7 Claims. (Cl. 90—38)

This invention relates to a machine for removing metal from both sides of work formed of thin sheet metal, and more particularly for removing the extruded metal or flash from an electrically welded seam of such thin sheet metal bodies.

An object of the present invention is to provide a machine of the reciprocable ram type, with means particularly adapted to this type of machine, for straightening the work ahead of the cutting tools and firmly holding and clamping the work adjacent its seam so that these tools will remove the flash even with the work surfaces throughout the length thereof, and to provide an arrangement adapted to remove the flash from both surfaces of the work by a continuous cut without injury to the work or rupture of its seam, the cutting tools employed having a form particularly adapted to provide a shearing cut which insures efficient and complete removal of the flash by a single stroke of the tool carrying ram or rams.

It is also an object of the present invention to provide a tool for use in connection with reciprocable ram trimmers, which tool will provide a shearing cut and prevent its advance cutting point from digging in, thus removing the flash smoothly and evenly with the surface of the work, and at the same time deflecting the removed metal, laterally out of the path of the tool to prevent clogging.

A further object is to provide a tool holder especially adapted for application to the ram or rams of a reciprocable ram trimmer of this character and for the purpose, which holder is arranged to vary rigidly, adjustably, and removably hold the cutting tool or bit within a rectangular opening in the reciprocable ram.

It is also an object to provide certain other new and useful features in the construction, arrangement and combination of elements in a machine for the purpose, all as hereinafter more fully set forth, reference being had to the accompanying drawings wherein Figure 1 is a side elevation of a machine illustrative of an embodiment of the present invention and showing portions broken away and in section;

Fig. 2 is an enlarged transverse section, substantially upon the line 2—2 of Fig. 1;

Fig. 3 is a similar section substantially upon the line 3—3 of Fig. 1;

Fig. 4 is an enlarged detail view showing in side elevation, a portion of a tool holder and tool or bit therein;

Fig. 5 is an end elevation of Fig. 4;

Fig. 6 is a sectional plan view on the line 6—6 of Fig. 4, and

Fig. 7 is an enlarged perspective view of the tool or bit detached and with the shank portion thereof broken away and in section.

Figure 1:
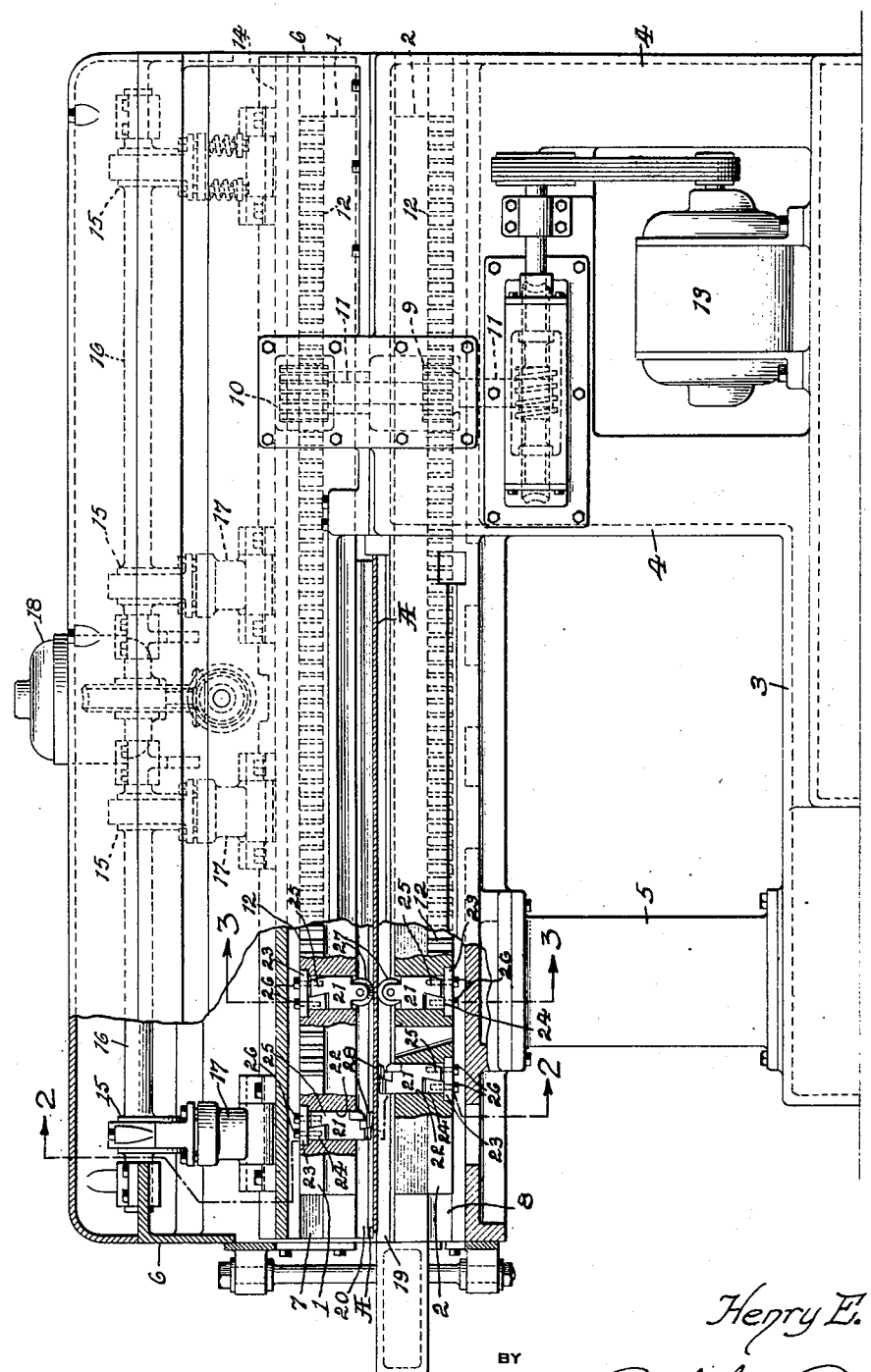

This invention relates to a machine for the purpose, of the reciprocable ram shaper type and wherein opposed ram members 1 and 2 are employed and are reciprocated longitudinally to move the bits or cutting tools longitudinally of an electrically welded seam of the work and remove the flash or extruded metal from both sides of the work by a single, continuous movement throughout the length of the seam. In order to do this work in this manner successfully, it is found that a certain relative relation of cutting tools is advantageous in preventing the tearing or breaking of the thin metal sheet or sheets, the edges of which are united by such seam, and that all waves or wrinkles developed in the thin metal adjacent the seam, during the welding operation, be removed.

Further, it is found that the disposal of the removed metal in the operation of such a machine, is a problem to be solved, and that a tool or tools of a certain type and construction are essential, whereby the removed metal is deflected laterally out of the path of such tool or tools, and that a certain construction of such tools is necessary in order to prevent the advance cutting point of the tool from digging into the work and tearing, roughening or disrupting the thin metal adjacent the seam thereof.

It is also found essential to provide adequate means for so mounting the tools upon the ram members that they will be rigidly held and may be quickly adjusted to vary the cut, a rectangular opening being provided in each ram for convenience and simplicity in such mounting.

As shown in the accompanying drawings, the machine comprises a base 3 upon which are erected the pedestals 4 and 5 for carrying a suitable horizontally disposed casing, indicated as a whole by the numeral 6 and formed with suitable guideways 7 and 8 for said rams, in which ways said rams are reciprocated longitudinally in any suitable manner, as by gears 9 and 10 on a vertical shaft 11, said gears being in mesh with rack teeth 12 formed upon one side of each ram member substantially throughout its length. Motion is imparted to said shaft 11 through a worm and worm wheel, from an electric motor 13 arranged in a suitable manner and mounted upon the base 3 within an opening in the pedestal 4. Obviously other means than that shown, may be provided for reciprocating said rams.

In order to permit the insertion between said rams of the thin metal plates A, the adjacent edges of which are united by an electrically welded seam causing an extrusion of metal or what is known as flash indicated at B, the upper ram 1 is suitably mounted in a carrier 14, which carrier is movable vertically within the guideway 7, said ram being moved toward and from said lower ram by means of eccentrics 15 upon a horizontally extending shaft 16 in the upper part of the casing 6, the embracing straps of which eccentrics have downward extensions 17 pivotally connected at their lower ends in any suitable manner to the upper side of the carrier 14. This eccentric shaft 16 is rotated in any suitable manner, as by an electric motor 18 mounted upon a bracket on one side of the casing 6 and connected to rotate said shaft, through suitable gearing.

To engage the work A adjacent each side of the seam thereof at its lower side, are work supporting bars 19 secured to the upper side of the fixed member forming the guideway 8 for the lower ram 2, these bars being spaced apart a greater distance than the width of the seam and extending the full length of the guideway to form a straight, even support for the work, and secured to the lower side of the carrier 14 in like spaced relation, are similar clamping bars 20 adapted to be brought down upon and firmly clamp the work between them and the bars 19 when said bars 20 are lowered by the lowering of said carrier 14 through the medium of the eccentrics 15 after the work has been placed in position.

A tool or bit holder 21 is secured within a rectangular opening 22 formed in each ram and extending vertically therethrough, each holder being adjustably secured in said opening by means of a cap plate 23 set into a recess in the ram and extending across and closing the end of the opening. Secured to the inner face of each cap plate and extending into a notch in the rear side of each holder 21, is a wedge member 24, which is wider at its free end than it is adjacent said cap plate, thus forming an inclined side to contact a like side of that portion or shank 25 of the holder which extends alongside the wedge member toward the cap. The free end of said wedge does not quite seat on the end of the notch in which it is located and the end of the portion 25 of the holder does not quite contact the cap plate, and its side opposite that which is inclined to contact with the inclosed side of said wedge, is cut away or inclined inwardly toward its free end. Therefore by loosening the bolts 26 which pass through openings in the cap plate and are screwed into screwthreaded openings in the adjacent end of the wedge 24 and portion 25 of the holder, said holder may be adjusted in its opening 22 to project its tool carrying end farther from the opening, and may then be made fast in the opening by tightening up on the bolt engaging the wedge, thus drawing said wedge toward the cap plate and wedging the tool holder firmly in place, such lateral wedging action of said wedge against the relieved shank portion 25 of the holder, tending to tilt the holder and cause it to bind within the opening in the ram, thus securely holding it in adjusted position against the severe strain imposed thereon by the draw cut of the tool or bit carried by its projecting end.

Where the flash is removed from both sides of the work by a single stroke of the ram or rams, a very severe strain is imposed upon the thin sheet metal comprising the work and upon the welded seam, so that there is great danger of breaking or tearing the seam or thin metal adjacent thereto, and to in part relieve the work from this strain, the tool for removing the flash from the lower side of the work may as shown be placed in advance, in the direction of the cutting movement, of the tool for removing the flash from the upper side so that these tools will not be opposite each other and will, therefore, be less liable to rupture the work. Either tool may be set in advance of the other, as desired.

Further, to insure the removal of the flash even with the surfaces of the sheets and to prevent the cutting tools from digging in wherever there happens to be any unevenness due to short waves, bends or wrinkles formed in the work during the welding operation, grooved rollers 27 are provided to engage the work and span the seam thereof, a short distance ahead of the cutting tools, these rolls being mounted upon holders like the holders 21 and within openings 22 in the rams, said rolls being in opposed relation to firmly clamp the work therebetween and thus roll out or straighten the work as the rams are reciprocated in the cutting direction. The work is thus straightened, eliminating any short bends, wrinkles, or unevenness in advance of the cutting tools so that they will remove the flash from both surfaces of the work, perfectly even and smooth therewith.

Each of the cutting tools or bits comprises, as shown in Figs. 4 to 7 inclusive, a body portion 28 having a reduced lower end or what may be termed blade portion 29 and a shank portion 30 extending upwardly from said body adjacent the rear end thereof. The forward end of the body projects forwardly from the shank and the end surface 31 thereof, as well as the end surface 32 of the blade portion, is beveled or formed at a rearward inclination, thus forming a surface which will deflect the chips or metal removed from the work by the sharp lower end cutting edge 33 as the tool is advanced by the ram during its working stroke. In order to form such proper sharp cutting edge it is necessary to relieve the bottom end surface of the blade portion 29, rearwardly from said cutting edge, as indicated by the dotted line $a$ in Fig. 7, and as the end surface 32 is formed at a rearward inclination laterally with its cutting edge of extended length due to the thickness of said blade, as previously described, it then is necessary to further relieve this bottom side of the blade, rearwardly from the edge 33, as at 34, or otherwise the sharp point indicated by the dotted lines at $b$ and formed by the meeting of the surfaces 29 and 32 with the unrelieved bottom surfaces would project downward beyond the desired cutting edge 33 as indicated by the dotted line $c$ due to such rearward and lateral inclination of the surface 32, and would dig into the work as the tool was advanced.

By giving the bit or cutting tool the form described, a very strong, rigid bit is provided having a lateral width which is greater than the width of the seam of the work to provide a sharp forward cutting edge of greater length than the width of the seam to remove all of the flash at a single stroke, said blade being of extended length horizontally, to give great strength and being relieved rearwardly from its cutting edge at its lower side in order to form such sharp cutting edge, and being further relieved to remove the sharp downwardly projecting piercing forward point which would otherwise dig into the work.

To rigidly and detachably hold the bit or cutting tool in place upon the tool holder 21, said holder is notched or stepped at its forward side and adjacent its lower end, to form horizontal abutment shoulders 35 and 36 as shown in Fig. 4, the inner end of the shoulder 35 being connected with the outer end of the shoulder 36 by a vertical surface 37, and the rear end of the shoulder 36 terminating at the upper end of a surface 38 which extends downward to the lower end of the holder in a slightly downward and forward inclination. The shank 30 of the tool has a rear end surface inclined downwardly and forwardly from the upper end of the shank to conform to the inclination of the surface 38, and the opposite or forward end surface of said shank is engaged by the curved rear side 39 of the lower end portion of a locking block 40 having a slight projection 41 near its upper end to engage the surface 37 adjacent the meeting angle of said surface and shoulder 35. A screw bolt 42 passes loosely through an opening in the block 40 and is screwed into a screwthreaded opening in the portion of the holder formed with said surface 37.

With this arrangement, the tool is very rigidly secured in place upon its holder by placing it within the notch of the holder between the shoulder 36 and surface 38 and against said surface, and then placing the locking block in place and turning up the bolt to draw said block toward the surface 37, the rounded or curved surface 39 of the block firmly contacting the forward end surface of the shank 30 and rocking upon the projection 41 as the bolt is tightened up. Due to the inclination of the surface 38, the pressure of the curved end of the block upon the tool shank, forces said shank to firmly seat within the notch between the shoulder 36 and surface 38, and the projection 41 and curved portion 39 provides a two point contact for the block so that the tool shank is firmly clamped in place by the use of the single bolt 42.

The inclined forward surface 32 on the tool provides a shearing cut which will deflect all of the severed metal laterally of the tool into the space alongside the tool and between it and the clamping bars 20 where it will not clog the tool at the upper side of the work and prevent efficient operation, and to permit the free escape of chips cut from the lower side of the work, an opening is formed through the ram 2 just ahead of the cutting tool.

With the described arrangement, the carrier 14 for the upper ram 1 is moved by power means to bring the clamping bars 20 on said carrier into work clamping position relative to the stationary work supporting bars 19 and thus firmly clamp the work therebetween at each side of the seam of the work and firmly hold and straighten the work throughout the length of the seam; and to eliminate any unevenness, kinks or wrinkles along and close to the seam, the rolls 27 are also brought into clamping engagement with the work by the same power actuated movement of said carrier. The work is thus effectually straightened and all unevenness eliminated so that the cutting tools mounted upon the rams, will effectually remove the flash from both sides of the work perfectly even with the surface thereof by a single continuous movement of the rams, and without danger of disrupting the thin metal sheets or the seam uniting them, the form and construction of the tools themselves also being a very material factor in effecting this desired result.

Obviously a reciprocating ram trimmer of a construction other than that shown in the accompanying drawings and embodying a ram or rams or similar tool carrying member, may be employed and the several features of the present construction combined therein to effect the desired ends in view and without departing from the spirit of the present invention.

Having thus fully described my invention, what I claim is:

1. A tool and tool holder for application to a longitudinally reciprocable ram of a machine for removing the flash from the electrically welded seam of thin sheet metal work, said ram having an opening therethrough transversely thereof, said holder comprising means for adjustably and detachably securing said holder in said opening and including a wedge member to bind said holder within said opening in said ram, said tool being formed with a shank at one end to seat within a notch in the lower end of said holder, means for detachably holding said tool shank seated in said notch with the lower horizontally extended portion of said tool projecting from said ram opening and with said forward end of said portion formed with a cutting edge of greater length than the width of said seam and arranged at a rearward angle to the line of cutting movement of said tool to deflect laterally, metal removed thereby and to remove the flash from one side of a seam of the work during a single working stroke of the ram.

2. A tool for the ram of a flash removing machine, said ram having a transverse opening, said tool including a holder to be received in said opening, means for securing said holder in said ram opening, a tool detachably secured in a notch in the lower end of said holder and within said opening, said tool comprising a horizontally extending body projecting from said notch and the shank seated in said notch, said body having a forward end, said tool having a cutting edge of greater length than the width of the seam of the work with said edge extending at an angle of less than ninety degrees to the line of cut to provide a shearing cut, the forward face of said tool being inclined rearwardly and upwardly from said edge, said tool having a side of extended length adjacent the work with said side formed with a double relief rearwardly from said edge to give tool clearance and prevent the forward point at one end of said cutting edge from digging into the work.

3. A tool for the ram of a flash removing machine, said tool comprising a tool holder for engagement within a transverse opening in said ram and having a notch in its lower end, said tool including a horizontally extending elongated body formed with a vertically extending shank adjacent the rear end thereof having a rear side for engagement with the side of said notch, said body being formed at its forward end with a sharp cutting edge of extended length and with an end face extending at a rearward inclination from said edge, said face also having a slant laterally of said body and said body being cut away at its bottom side rearwardly from said cutting edge to give tool relief and the forward point portion of said cutting edge portion being cut away rearwardly to prevent said point portion from digging into the work.

4. A tool holder for the ram of a flash removing machine, said ram having a transverse opening of rectangular form and a recess at one end of said opening; said holder being of rectangular form in cross section with a notch therein at one end having a side inclined upwardly and toward the open opposite side of said notch, means for adjustably securing said holder in said opening in the ram and comprising a cap to seat within the recess in the ram, a wedge member within said notch to engage the inclined side thereof, and means extending through said cap and engaging said wedge to draw the same toward said cap and wedge the holder within the ram opening, and a tool carried by the opposite end of said holder to project from the opening in the ram.

5. A tool holder for the ram of a flash removing machine, said ram having a transverse opening of rectangular form in cross section longitudinally of the ram; said holder comprising a body shaped for insertion in said ram opening and notched at one end to form steps with the rearward face of one step inclined downwardly and forwardly, a tool comprising a body portion of a length substantially equal to the length of the ram opening longitudinally of the ram and having a cutting edge at its forward end and an upwardly extending shank at its rear end to seat within said step against said face, a locking block within another of said steps and provided with a projection near its upper end to engage the rear face of said notch near the meeting angle of the faces of said notch and a lower reduced end portion to engage the forward side of said shank above and adjacent the forwardly projecting end of said body within said ram opening, and means passing loosely through an opening in said block and into an opening in said holder to lock the block upon said projection and force its lower end portion into clamping contact with the forward side of said tool shank said tool and block being within the cross sectional area longitudinally of the ram of said opening therein.

6. A tool and tool holder for the ram of a flash removing machine having a transverse opening; said holder comprising a body to fit within the ram opening and provided with a notch at its upper end in one side of the body formed with a downwardly and forwardly inclined face opposite the open side of the notch, a wedge member within said notch, means for moving said wedge member longitudinally to wedge it between the wall of the ram opening and the inclined face of the notch, said body being notched upwardly of its lower end to form steps, the lower of which steps is formed with a side inclined upwardly and rearwardly from the lower end of the body, a tool having a body portion of extended length formed with a sharp forward cutting edge and with a shank extending upwardly from its rear end, the rear side of said shank being formed to conform to the inclination of the side of said step, and a clamping block to seat at one end within a step above the upper end of the tool shank and having a lower end to bear upon the forward side of said shank, and means for forcing said block to seat within said step at its upper end with its lower end in contact with said shank and adapted to permit said block to rock upon said seat.

7. A tool and tool holder for application to the reciprocable ram of a machine for removing flash from electrically welded seams of thin sheet metal work, which ram is provided with a transverse opening; said tool holder comprising a member to fit closely within said ram opening and formed with end notches each having an inclined side, a wedge member in said notch at the upper end of said holder, and said tool having a shank at one end seated against the inclined side of said notch in the lower end of said holder and formed with a forwardly projecting end portion having a forward end cutting edge, and clamping means engaging the forward side of said tool and seated within a notch in the lower end of said holder with said forward end of said tool below said clamping means.

HENRY E. MORTON.